US012335677B2

(12) United States Patent
Neergaard et al.

(10) Patent No.: US 12,335,677 B2
(45) Date of Patent: Jun. 17, 2025

(54) HEADSET WITH IMPROVED HEADBAND AND METHOD FOR MANUFACTURING THE HEADSET

(71) Applicant: Sonos, Inc., Santa Barbara, CA (US)

(72) Inventors: Samer Richard Neergaard, Boston, MA (US); Ronald W. Roberts, Melrose, MA (US)

(73) Assignee: SONOS, INC., Goleta, CA (US)

( * ) Notice: Subject to any disclaimer, the term of this patent is extended or adjusted under 35 U.S.C. 154(b) by 0 days.

(21) Appl. No.: 18/627,867

(22) Filed: Apr. 5, 2024

(65) Prior Publication Data

US 2024/0323583 A1 Sep. 26, 2024

Related U.S. Application Data

(63) Continuation of application No. 17/686,746, filed on Mar. 4, 2022, now Pat. No. 11,962,964.

(60) Provisional application No. 63/157,989, filed on Mar. 8, 2021.

(51) Int. Cl.
*H04R 1/10* (2006.01)

(52) U.S. Cl.
CPC ........... *H04R 1/105* (2013.01); *H04R 1/1008* (2013.01); *H04R 1/1041* (2013.01); *H04R 1/1066* (2013.01); *H04R 2420/07* (2013.01)

(58) Field of Classification Search
CPC .................. H04R 1/105; H04R 1/1008; H04R 1/1041; H04R 1/1066; H04R 2420/07; H04R 5/0335
See application file for complete search history.

(56) References Cited

U.S. PATENT DOCUMENTS

| | | | | |
|---|---|---|---|---|
| 4,243,851 | A * | 1/1981 | Forney | H04R 5/0335 381/374 |
| 5,440,644 | A | 8/1995 | Farinelli et al. | |
| 5,604,813 | A * | 2/1997 | Evans | G10K 11/17854 381/71.13 |
| 5,761,320 | A | 6/1998 | Farinelli et al. | |
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Oyesola C Ojo
(74) *Attorney, Agent, or Firm* — Workman Nydegger

(57) ABSTRACT

A headset includes a first earcup, a second earcup, and a headband. The headband includes a connecting member having a first end coupled to the first earcup and a second end coupled to the second earcup. A cushion is disposed below the connecting member. The cushion extends between the first end and the second end. The cushion includes a middle region configured to have a first density and adjacent side regions configured to have a second density that is higher than the first density.

20 Claims, 6 Drawing Sheets

(56) References Cited

U.S. PATENT DOCUMENTS

| | | | | |
|---|---|---|---|---|
| 6,522,886 | B1 | 2/2003 | Youngs et al. | |
| 6,584,984 | B2 * | 7/2003 | Kelly | A45D 8/36 132/273 |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 9,467,780 | B2 * | 10/2016 | Kelly | H04R 5/04 |
| 10,779,071 | B2 * | 9/2020 | Wu | H04R 1/105 |
| 11,395,078 | B2 * | 7/2022 | Lin | G01H 11/06 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2012/0140973 | A1 * | 6/2012 | Olodort | H04R 1/1066 381/375 |
| 2014/0270228 | A1 * | 9/2014 | Oishi | H04R 1/1008 381/74 |
| 2015/0139472 | A1 * | 5/2015 | Solomon | H04R 1/1091 381/378 |
| 2018/0014973 | A1 * | 1/2018 | Echeverri | H04R 1/105 |
| 2022/0070565 | A1 * | 3/2022 | Degraye | H04R 1/028 |
| 2022/0210560 | A1 * | 6/2022 | Lin | H04R 1/1058 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Non-Final Office Action mailed on May 25, 2023, issued in connection with U.S. Appl. No. 17/686,746, filed Mar. 4, 2022, 11 pages.

Notice of Allowance mailed on Nov. 27, 2023, issued in connection with U.S. Appl. No. 17/686,746, filed Mar. 4, 2022, 6 pages.

Palm, Inc., "Handbook for the Palm VII Handheld," May 2000, 311 pages.

Presentations at WinHEC 2000, May 2000, 138 pages.

*Sonos, Inc.* v. *DM Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

HEADSET WITH IMPROVED HEADBAND AND METHOD FOR MANUFACTURING THE HEADSET

CROSS-REFERENCE TO RELATED APPLICATIONS

This application is a continuation of U.S. application Ser. No. 17/686,746 titled "Headset With Improved Headband And Method For Manufacturing The Headset," filed on Mar. 4, 2022, which application claims priority to U.S. Provisional App. No. 63/157,989 titled "Headset With Improved Headband And Method For Manufacturing The Headset," filed on Mar. 8, 2021, and currently pending. The entire contents of each of the above applications is incorporated herein by reference in their entireties.

FIELD

This application generally relates to headsets. In particular, this application describes a headset having an improved headband and a method for manufacturing the headset.

DESCRIPTION OF RELATED ART

Over-the-ear headsets typically include a pair of earcups having speakers and other circuitry arranged therein. The earcups are normally supported and held in place on a user via a headband. The headband may provide a path for running conductors between the earcups. The headband may also be configured to provide a resilient force that presses the earcups against/over the ears.

Some over-the-ear headsets include wireless circuitry, noise cancellation circuity, amplifiers, etc. The additional circuitry increases the weight of the headset. The added weight can result in an uneven distribution of pressure along the user's head, which can lead to discomfort.

SUMMARY

In a first aspect, a headset includes a first earcup, a second earcup, and a headband. The headband includes a connecting member having a first end coupled to the first earcup and a second end coupled to the second earcup. A cushion is disposed below the connecting member. The cushion extends between the first end and the second end. The cushion includes a middle region configured to have a first density and adjacent side regions configured to have a second density that is higher than the first density.

In a second aspect, a method for manufacturing a headset is provided. The method includes configuring a cushion of a headband to have a first density in a middle region and a second density that is higher than the first density in adjacent side regions. The cushion is attached to a connecting member having a first end and a second end. The first end and the second end are coupled to a first earcup and a second earcup, respectively.

In a third aspect, a playback device includes playback circuitry, first and second earcups, and a headband. The playback circuitry is configured to wirelessly receive audio content. The first and second earcups include first and second speakers, respectively, configured to playback the audio content. The headband includes a connecting member having a first end coupled to the first earcup and a second end coupled to the second earcup. The headband further includes a cushion that is disposed below the connecting member. The cushion extends between the first end and the second end and comprises a middle region configured to have a first density and adjacent side regions configured to have a second density that is higher than the first density.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1:
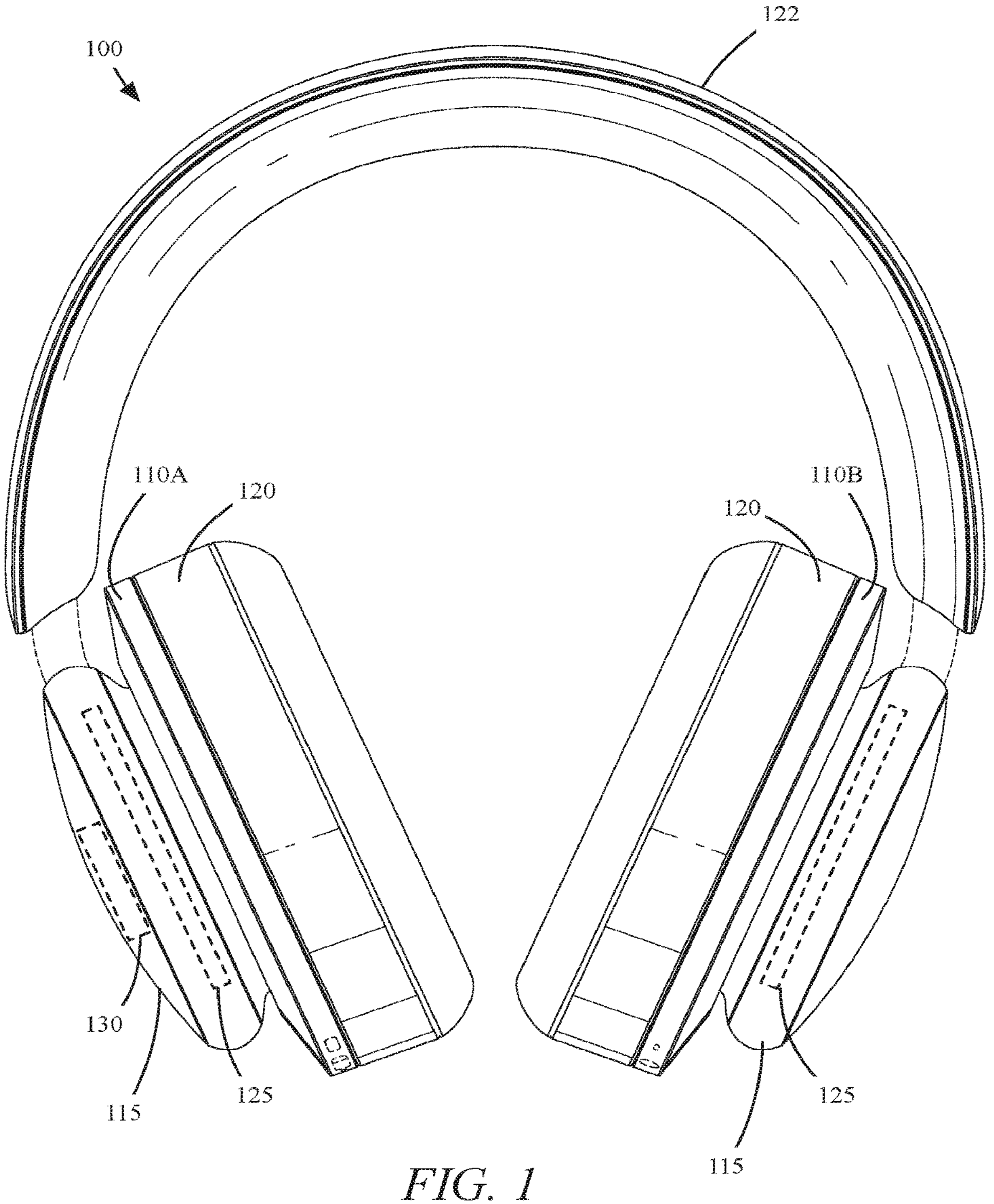
FIG. 1 illustrates a playback device that corresponds to a headset, in accordance with an example.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to one skilled in the art, may occur in amounts that do not preclude the effect the characteristic was intended to provide.

As noted above, some over-the-ear headsets include wireless circuitry, noise cancellation circuitry, amplifiers, etc. The additional circuitry increases the weight of the headset. The added weight can result in an uneven distribution of pressure along the user's head, which can lead to discomfort.

To mitigate some discomfort, the headband may include a cushion. However, the pressure applied by the cushion may not be uniformly applied to the user's head. For example, excessive pressure may be applied by the center of the headset.

Various examples are disclosed herein that overcome these issues. For instance, an example of a headset includes a first earcup, a second earcup, and a headband. The headband includes a connecting member having a first end coupled to the first earcup and a second end coupled to the second earcup. The headband includes a cushion having a middle region configured to have a first density and adjacent side regions configured to have a second density that is higher than the first density. The difference in density between the respective regions results in more uniform pressure being applied to the user's head.

In one example, the cushion includes a support member that extends between the first end and the second end of the connecting member. The support member is formed from a material having a density that corresponds to the second density. The support member defines a cutout in a middle region. The cushion includes an insert configured to fit within the cutout. The insert is formed from a material having a density that corresponds to the first density (i.e., a density that is lower than the density of the support member).

In another example, a cushion is formed from a foam material having a density that corresponds to the second density and which is configured to extend between the first end and the second end of the connecting member. The middle region of the foam material is subjected to a crushing operation to lower the density of the foam material in the middle region to the first density (i.e., a density that is lower than the density of the foam in the non-crushed region).

FIG. 1 illustrates an example of a playback device 100 that corresponds to a headset. The playback device 100 includes a first earcup 110A, a second earcup 110B, and a headband 122 coupled to the first earcup 110A and the second earcup 110B. In an example, the first earcup 110A and the second earcup 110B are adjustably coupled to the headband 122 to facilitate adjustment of the earcups (110A, 110B) to the desired comfort level for a particular user.

An example of each earcup (110A, 110B) includes a housing 115, a speaker 125, and a cushion 120. The cushion 120 is configured to substantially surround the user's ear and to provide a space therein that acoustically isolates the user's ear from sounds generated outside of the cushion 120.

In an example, the speaker 125 is disposed within the housing 115. Each speaker 125 is configured to playback audio content received by the playback device 100. For example, a first speaker may play the left channel of the audio content, and the right speaker may playback the right channel of audio content. In some examples, more than one speaker is disposed within the housing 115. For example, a tweeter, mid-range speaker, a low-range speaker, etc., can be disposed within the housing 115.

In an example, the playback device 100 includes playback circuitry 130, and the playback circuitry 130 is arranged within at least one of the earcups (110A, 110B). The playback circuitry 130 is configured to receive and process the audio content and to drive the speakers 125. For instance, an example of the playback circuitry 130 includes an amplifier configured to drive the speakers 125. An example of the playback circuitry 130 includes noise cancellation circuitry configured to further attenuate the user's ear from sounds generated outside of the cushion 120. In this regard, an example of the playback circuitry 130 includes a microphone in communications with the playback circuitry 130 configured to receive audio signals generated outside of the earcup (110A, 110B) for cancellation by the noise cancellation circuitry.

An example of the playback circuitry 130 includes a battery and charging circuitry for charging the battery. Some examples of the charging circuitry facilitate wirelessly charging the battery. For instance, an example of the charging circuitry includes energy receiving coils configured to inductively receive energy from energy transmission coils of a charging base.

An example of the playback circuitry 130 is configured to wirelessly receive audio content. For instance, an example of the playback circuitry 130 wirelessly receives audio content from a wireless router via an 802.11 based protocol. Another example of the playback circuitry 130 wirelessly receives Bluetooth® audio content from, for example, a mobile device. In some examples, the playback circuitry 130 is configured to simultaneously receive audio content from 802.11 based networks, Bluetooth® networks, and other networks. For instance, an example of the playback device 100 is part of a group of playback devices, such as those that belong to a Sonos® music system. In this regard, an example of the playback circuitry 130 is configured to receive and playback audio content in synchrony with other playback devices of the group of playback devices.

An example of the headband 122 has a generally curved shaped. An example of the curved shaped defines an arc having a radius sized to accommodate the shape of a typical user's head. In an example, the middle region of the headband (see e.g., middle region 215 in FIG. 2) defines a generally curved shape having a first radius and adjacent side regions of the headband 122 (see e.g., adjacent side regions 217 in FIG. 2) define a generally curved shape having a second radius that is different from the first radius. For instance, in an example, when unstretched (e.g., not being worn), the first radius is about 65-70 mm, and the second radius is about 68-72 mm. When stretched or worn over a typical user's head, the first radius is about 113-117 mm. This assumes that the top of the head of the user has a radius of about 90 mm.

Figure 2:
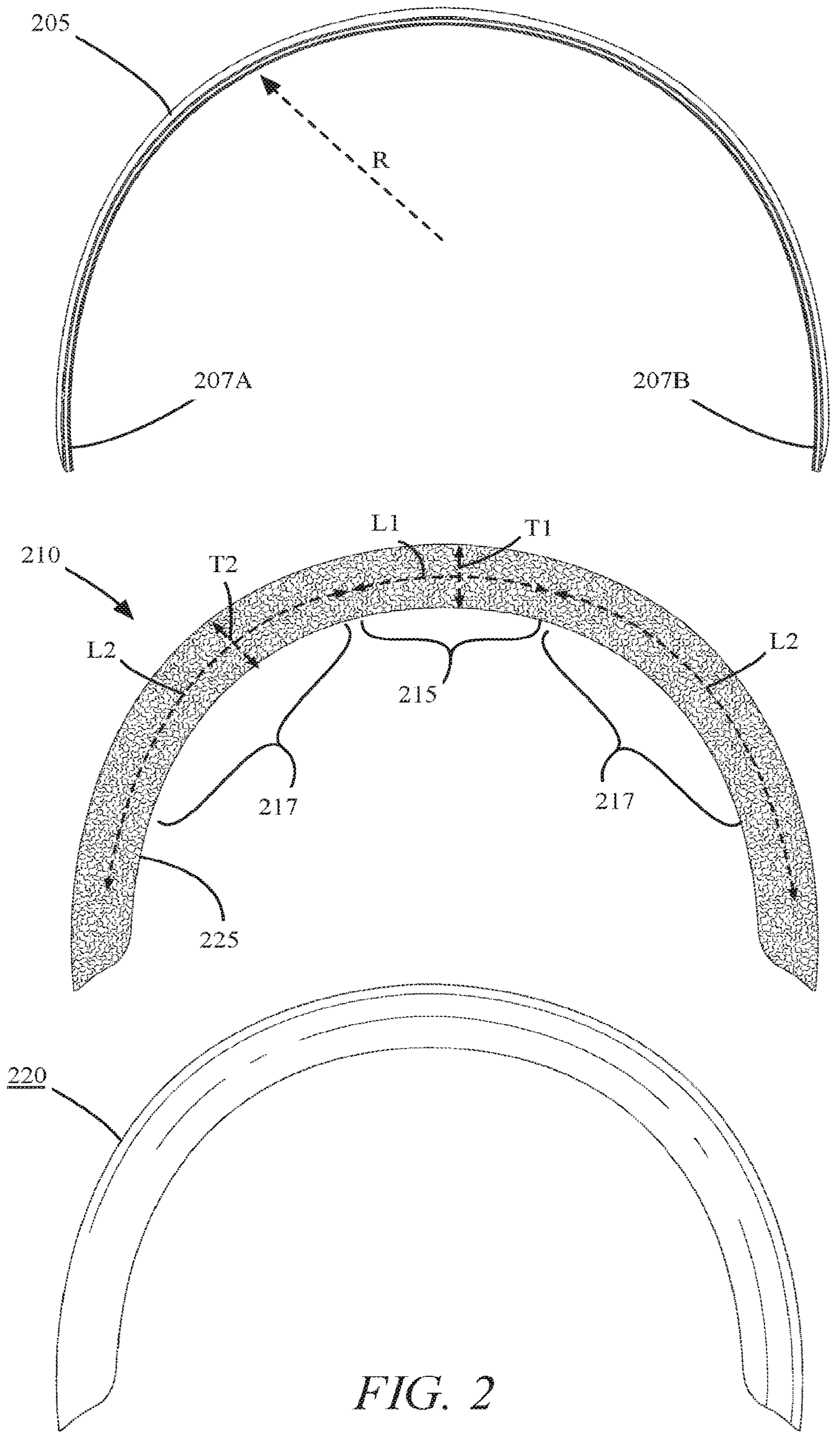
FIG. 2 illustrates an exploded view of a headband of the playback device, in accordance with an example.

FIG. 2 illustrates an exploded view of an example of the headband 122 of the playback device 100. As shown, the headband 122 includes a connecting member 205 and a cushion 210. In an example, the headband 122 further includes a covering 220. In an example, the upper curvature of the headband 122 is defined by the top surface of the connecting member 205 (i.e., the side facing away from the user's head), and the lower curvature is defined by the lower surface of the cushion 210 (i.e., the side facing towards the user's head).

An example of the connecting member 205 is formed from a rigid yet resilient material, such as a plastic or metal material. In an example, the connecting member 205 defines an arc having a radius configured to accommodate the head of a typical user. For example, the connecting member 205 may have a radius, R, of about 80 mm. In an example, the connecting member 205 includes a first end 207A and a second end 207B that are respectfully configured to be coupled to the first earcup 110A and the second earcup 110B. For example, the first end 207A and the second end 207B of the connecting member 205 may include a coupler configured to attach with a corresponding coupler on a respective earcup. The coupler may be configured to facilitate pivotal movement of the earcup and length adjustment of the headband 122.

An example of the cushion 210 is disposed below the connecting member 205. In an example, the cushion 210 is fixed to the connecting member 205 with, for example, an adhesive such as a glue or a double-sided adhesive tape. Other types of attachment mechanisms may be used. In another example, the cushion 210 is held in place against the connecting member 205 by the covering 220.

An example of the cushion 210 extends between the first end 207A and the second end 207B of the connecting member 205. An example of the cushion 210 comprises a middle region 215 configured to have a first density and adjacent side regions 217 configured to have a second density that is higher than the first density. The first density and the second density are configured such that when the headband 122 is worn, the pressure applied by the headband 122 is uniformly distributed across a support surface (e.g., the head of the user). By contrast, in cases where the density is uniform, the amount of pressure applied in the middle region 215 can be excessive. This problem can be exacerbated when the weight of the headset is relatively high.

In an example, the first density is about 60 $kg/m^3$ and the second density is about 83 $kg/m^3$. In another example, the first density is about 25% lower than the second density.

In an example, in a direction from the connecting member 205 to a contact surface 225, a thickness, T1, of the middle region 215 substantially matches a thickness, T2, of the adjacent side regions 217. In an example, thickness T1 and T2 are about 9.5 mm. In another example, a length, L1, of the middle region 215 along the connecting member 205 is between about 25 mm and 35 mm (when considering the dovetail features). In this example, the length, L2, of each adjacent side region 217 is about 50 mm. In another example, the overall length of the cushion 210 is about 135 mm. In this example, the length, L1, of the middle region 215 corresponds to 35% of the overall length, and the length, L2, of the adjacent side region corresponds to the balance of the overall length.

In an example, the length, L1, is selected based on a parameterized Hertzian contact stress analysis-based model. For instance, an example of the parameterized model takes as input one or more of a radius associated with a surface (e.g., a radius approximating the user's head), a radius associated with a headband 122 (e.g., the radius, R, of the connecting member 205 after being stretched onto the head), a length (e.g., L1) representing the length of the middle region 215, and an overall length of the headband 122 (e.g., the sum of L1 and 2×L2). The model outputs a value indicative of the pressure distribution associated with the headband 122. That is, the model outputs a value indicative of the differences in pressure that would be felt by the user. In an example, the parameters of the model are adjusted through successive iterations to find a value of L1 that minimizes the value of the pressure distribution. That is, the parameters are adjusted to make the pressure distribution more uniform. More uniform pressure results in greater comfort. In an example, various parameters of the model are fixed, and the length, L1, of the middle region 215 is adjusted to find a value for the length, L1, that results in the uniform pressure distribution across the headband 122.

In an example, the covering 220 is configured to be relatively moisture impermeable and to provide comfort. For instance, an example of the covering 220 corresponds to a faux leather material such as leatherette, PU Leather, etc. In an example, the covering 220 wraps around the cushion 210 and is fixed to the connecting member 205 with an adhesive. In another example, the covering 220 may be wrapped around the underside of the cushion 210 and over the connecting member 205.

In an example, the connecting member 205 is wrapped in a faux leather (e.g., leatherette, PU Leather, etc.) and the covering 220 is made from a silicone material.

Figure 3A:
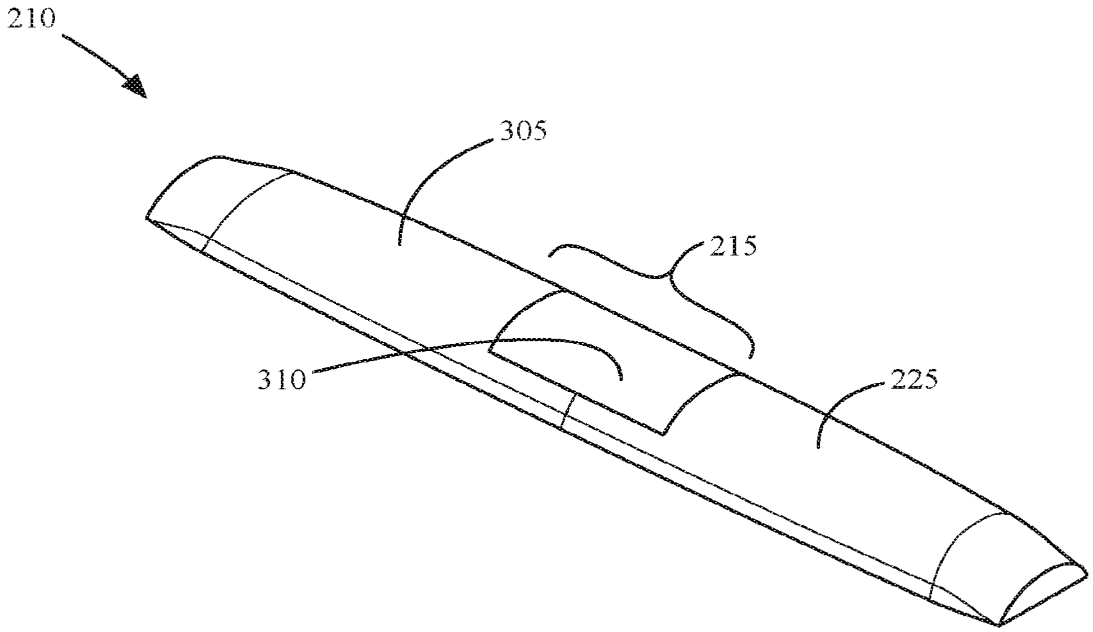
FIG. 3A illustrates a cushion for a headband, in accordance with an example.

FIG. 3A illustrates an example of the cushion 210. This example of the cushion 210 includes a support member 305 and an insert 310. The support member 305 extends between the first end 207A and the second end 207B of the connecting member 205. An example of the support member 305 defines a cutout 315 in a middle region 215 configured to receive the insert 310. When the insert 310 is inserted within the cutout 315, the contact surface 225 of the cushion 210 defines a generally uniform arc.

In this example, the insert 310 is formed from a material having a density that is lower than the density of the support member 305. For instance, an example of the insert 310 is formed from having a density of about 60 $kg/m^3$. And an example of the support member 305 is formed from foam having a density of about 83 $kg/m^3$.

Figure 3B:
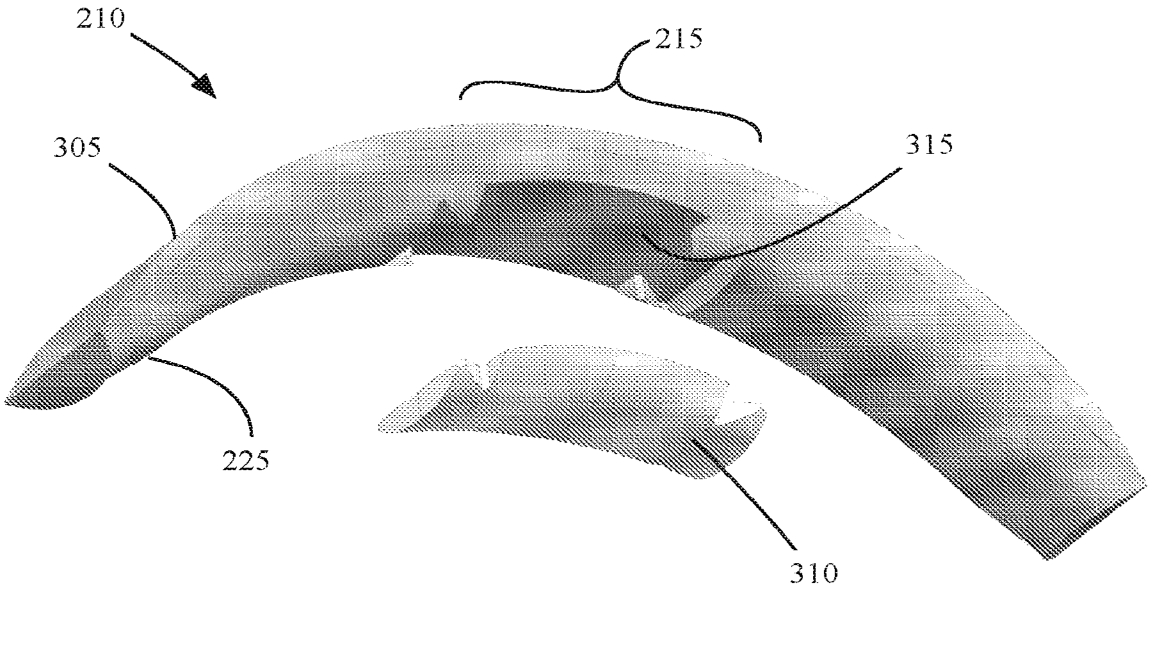
FIG. 3B illustrates a cushion for a headband that includes dovetail interlocking features, in accordance with an example.

In some examples, the insert 310 is held in place by frictional forces and subsequently by the covering 220. That is, the insert 310 is held in place without the use of an adhesive, which could otherwise increase the stiffness of the insert 310 and reduce the comfort afforded by the insert 310. As shown in FIG. 3B, in some examples, the ends of the insert 310 are configured to dovetail/interlock with complementary regions of the support member 305 to further increase the frictional forces described above.

Figure 3C:
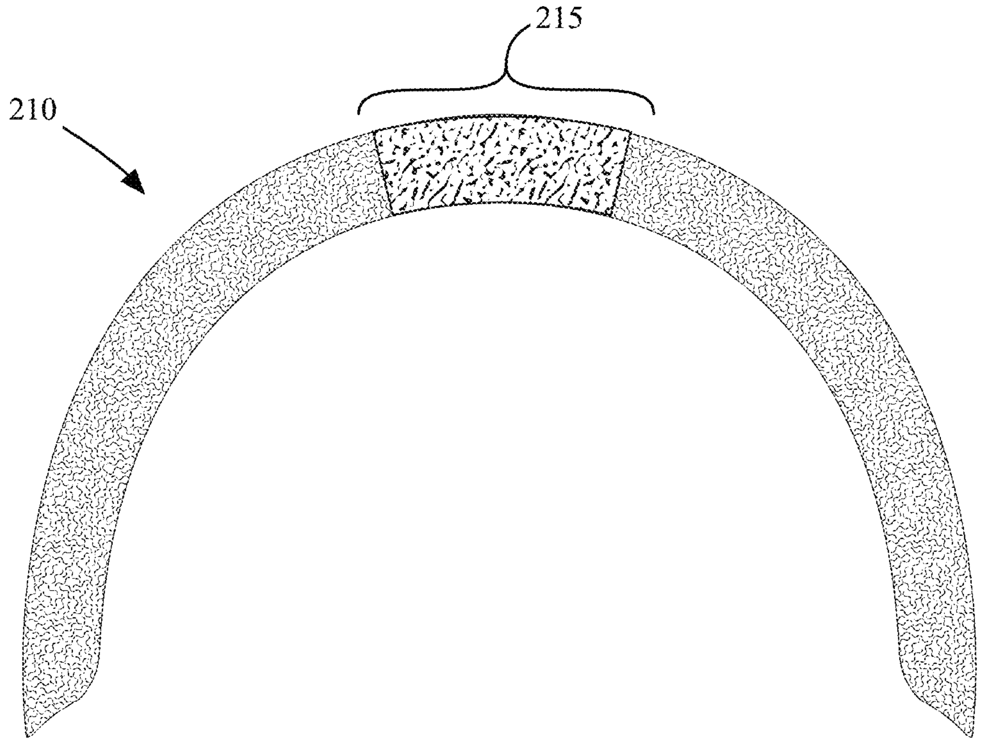
FIG. 3C illustrates another cushion of a headband, in accordance with an example.

FIG. 3C illustrates another example of the cushion 210. In this example, the cushion 210 is formed from a material that has a density of about 80-85 $kg/m^3$. The middle region 215 of the cushion 210 is subjected to a crushing operation, which lowers the density of the middle region 215. For instance, an example of the cushion 210 is formed from a foam material having a closed-cell structure. The middle region 215 of the foam material is then subjected to crushing (e.g., by passing the middle region 215 through rollers) that, via shearing action, changes the cells in the middle region 215 from closed cells to open cells that have a lower density or stiffness.

Figure 4:
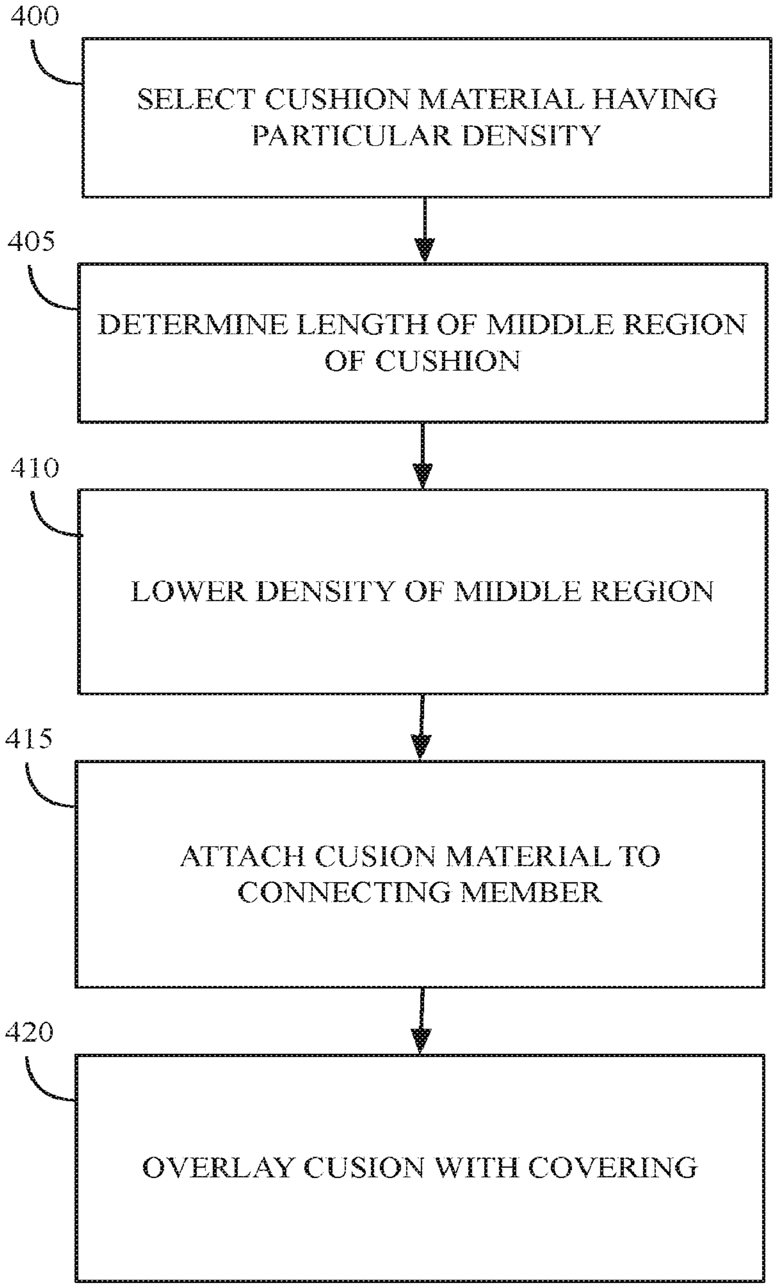
FIG. 4 illustrates operations that are performed in manufacturing a headset, in accordance with an example.

FIG. 4 illustrates examples of operations that are performed in manufacturing a headset. The operations of FIG. 4 are best understood with reference to FIGS. 1-3C, which are described above.

At block 400, a cushion material having a particular density is selected. An example of the cushion material is a foam material having a closed-cell structure such as CFNT-EGS manufactured by 3M Corp. An example of the cushion material has a density of about 80-85 $kg/m^3$. An example of the cushion material has a thickness, T2, of about 9.5 mm, and an overall length of about 135 mm.

At block 405, a length, L1, of a middle region 215 of the headband is determined, and at block 410, the density of the middle region 215 of the cushion material is lowered. In an example, the length, L1, is selected based on a parameterized Hertzian contact stress analysis-based model. For instance, an example of the parameterized model takes as input one or more of a radius associated with a surface (e.g., a radius approximating the user's head), a radius associated with a headband 122 (e.g., the radius, R, of the connecting member 205), a length (e.g., L1) representing the length of the middle region 215, and overall length (e.g., the sum of L1 and 2×L2) of the headband 122. The model outputs a value indicative of the pressure distribution associated with the headband 122. That is, the model outputs a value indicative of the differences in pressure that would be felt by the user. In an example, the parameters of the model are adjusted through successive iterations to find a value of L1 that minimizes the value of the pressure distribution. That is, the parameters are adjusted to make the pressure distribution more uniform. More uniform pressure results in greater comfort. In an example, various parameters of the model are fixed, and the length, L1, of the middle region 215 is adjusted to find a value for the length, L1, that results in the uniform pressure distribution across the headband 122.

In an example, the density of the middle region 215 is lowered by forming a cutout 315 in the middle region 215 and then inserting into the cutout an insert 310. When the insert 310 is inserted, the contact surface 225 of the cushion 210 defines a generally uniform arc. In this example, the insert 310 is formed from a material having a density that is lower than the density of the cushion material. For instance, an example of the insert 310 is formed from foam No. 6015 manufactured by Dongguan Tarry Corp. and has a density of about 60 $kg/m^3$. As noted above, in an example, the ends of the insert 310 are configured to dovetail/interlock with complementary regions of the cutout 315.

In another example, the density of the middle region 215 is lowered by subjecting the middle region of the cushion material to a crushing operation. The crushing operation changes the cells in the middle region 215 from closed cells to open cells that have a lower density or stiffness.

At block 415, the cushion material is attached to a connecting member 205. As noted above, an example of the connecting member 205 is formed from a rigid yet resilient material, such as a plastic or metal material. The connecting member 205 defines an arc having a radius configured to accommodate the head of a typical user. In an example, the cushion material is disposed below the connecting member 205 and is fixed to the connecting member 205 with, for example, an adhesive such as a glue or a double-sided adhesive tape.

At block 420, the cushion material is overlayed with a covering 220. In some examples, the covering 220 is used to fix the cushion against the connecting member 205 rather than the adhesive described above. As noted above, an example if the covering 220 is configured to be relatively moisture impermeable and to provide comfort. An example of the covering 220 corresponds to a faux leather material such as leatherette. In an example, the covering 220 wraps around the cushion material and is fixed to the connecting member 205 with an adhesive.

Figure 5:
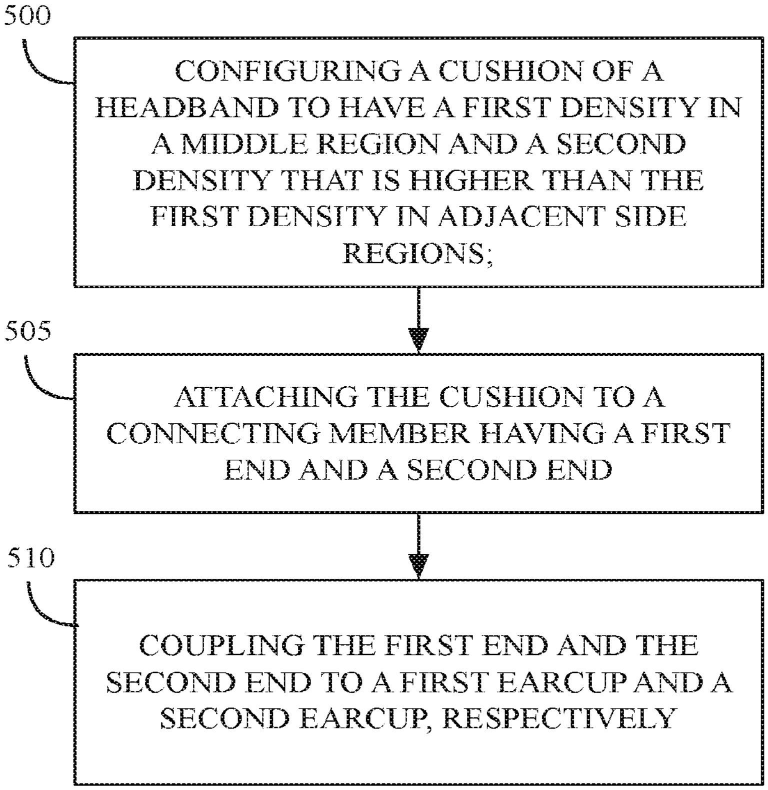
FIG. 5 illustrates alternative operations that are performed in manufacturing a headset, in accordance with an example.

FIG. 5 illustrates alternative operations that are performed in manufacturing a headset. Block 500 involves configuring a cushion of a headband to have a first density in a middle region and a second density that is higher than the first density in adjacent side regions.

Block 505 involves attaching the cushion to a connecting member having a first end and a second end.

Block 510 involves coupling the first end and the second end to a first earcup and a second earcup, respectively.

An example further involves overlaying at least the cushion with a covering.

In an example, configuring the cushion to have a first density in a middle region and a second density in adjacent side regions involves forming a support member from a material having a density that corresponds to the second density, and which is configured to extend between the first end and the second end of the connecting member. In this example, a cutout is formed in a middle region of the support member. An insert is then arranged within the cutout. The insert is formed from a material having a density that corresponds to the first density.

In an example, configuring the cushion to have a first density in a middle region and a second density in adjacent side regions involves providing a foam material having a density that corresponds to the second density, and which is configured to extend between the first end and the second end of the connecting member wherein in a middle region, The middle region of the foam is then subjected to a crushing operation to lower a density of the foam material in the middle region to the first density.

An example involves providing a Hertzian contact stress analysis-based parameterized model that outputs a value indicative of a pressure differential across a contact surface of the headset as a function of a length of the middle region. The length is iteratively adjusted to identify a length that minimizes the pressure differential across the contact surface. The middle region is configured to have the identified length.

In an example, configuring the cushion of the headband to have a first density in a middle region and a second density that is higher than the first density in adjacent side regions involves configuring the cushion of the headband to have a density of about 60 $kg/m^3$ in a middle region and a density of about 83 $kg/m^3$ in adjacent side regions.

In an example, configuring the cushion of the headband to have a first density in a middle region and a second density that is higher than the first density in adjacent side regions involves configuring the cushion of the headband to have a density in the middle region that is 25% lower than the density in the adjacent side regions.

In an example, the first density and the second density are configured such that when the headband is worn, the headband applies uniform pressure.

In an example, the middle region of the cushion is configured to have a length of between about 25 mm and 35 mm (when considering the dovetail features) and the length of each adjacent side region is configured to be about 50 mm. In another example, the ratio of the length of the adjacent side regions to the middle region may be a ratio of 2.9:1.

In an example, in a direction from the connecting member to a contact surface, a thickness of the middle region of the cushion is configured to substantially match a thickness of the adjacent side regions.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A headset comprising:

a first earcup and a second earcup; and a headband, wherein the headband comprises:

a connecting member having a first end coupled to the first earcup and a second end coupled to the second earcup;

a cushion disposed below the connecting member, wherein the cushion extends between the first end and the second end and comprises a middle region configured to have a first density and adjacent side regions configured to have a second density that is higher than the first density; and wherein the cushion comprises:

a first side region positioned adjacent to the first end, a second side region positioned adjacent to the second end, and the middle region being disposed along the headband between the first side region and the second side region.

2. The headset according to claim 1, wherein the second density is about 83 kg/$m^3$.

3. The headset according to claim 1, wherein the first density is about 60 kg/$m^3$.

4. The headset according to claim 1, wherein the first density is about 25% lower than the second density.

5. The headset according to claim 1, wherein the first density and the second density are configured such that when the headband is worn, the headband applies uniform pressure to a user's head.

6. The headset according to claim 1, wherein a length of the middle region along the connecting member is between about 25 mm and 35 mm, and a length of each adjacent side region is about 50 mm.

7. The headset according to claim 1, wherein in a direction from the connecting member to a contact surface, a thickness of the middle region substantially matches a thickness of the adjacent side regions.

8. The headset according to claim 1, wherein the cushion comprises:

a support member that extends between the first end and the second end, wherein the support member defines a support member cutout in a middle region, wherein the support member is formed from a material having a density that corresponds to the second density; and an insert configured to fit within the support member cutout, wherein the insert is formed from a material having a density that corresponds to the first density.

9. The headset according to claim 8, wherein the support member and the insert define complementary dovetail features that facilitate frictionally securing the insert within the support member cutout without an adhesive.

10. The headset according to claim 1, wherein the cushion comprises a foam material, wherein in a middle region, the foam material is subjected to a crushing operation to lower a density of the foam material in the middle region.

11. A method for manufacturing a headset comprising:

configuring a cushion of a headband to have a first density in a middle region and a second density that is higher than the first density in adjacent side regions;

attaching the cushion to a connecting member having a first end and a second end; and coupling the first end and the second end to a first earcup and a second earcup, respectively; and wherein the cushion comprises:

a first side region positioned adjacent to the first end, a second side region positioned adjacent to the second end, and the middle region being disposed along the headband between the first side region and the second side region.

12. The method according to claim 11, further comprising:

overlaying at least the cushion with a covering.

13. The method according to claim 11, wherein configuring the cushion to have a first density in a middle region and a second density in adjacent side regions comprises:

forming a support member from a material having a density that corresponds to the second density, and which is configured to extend between the first end and the second end of the connecting member;

forming a cutout in a middle region of the support member; and arranging an insert within the cutout, wherein the insert is formed from a material having a density that corresponds to the first density.

14. The method according to claim 11, wherein configuring the cushion to have a first density in a middle region and a second density in adjacent side regions comprises:

providing a foam material having a density that corresponds to the second density, and which is configured to extend between the first end and the second end of the connecting member wherein in a middle region; and subjecting the middle region of the foam material to a crushing operation to lower a density of the foam material in the middle region to the first density.

15. The method according to claim 11, further comprising:

providing a Hertzian contact stress analysis based parameterized model that outputs a value indicative of a pressure differential across a contact surface of the headset as a function of a length of the middle region;

iteratively adjusting the length to identify a length that minimizes the pressure differential across the contact surface; and configuring the middle region to have the identified length.

16. A playback device comprising:

playback circuitry configured to wirelessly receive audio content; and first and second earcups comprising first and second speakers, respectively, configured to playback the audio content; and a headband, wherein the headband comprises:

a connecting member having a first end coupled to the first earcup and a second end coupled to the second earcup, and a cushion disposed below the connecting member, wherein the cushion extends between the first end and the second end and comprises a middle region configured to have a first density and adjacent side regions configured to have a second density that is higher than the first density; and wherein the cushion comprises:

a first side region positioned adjacent to the first end, a second side region positioned adjacent to the second end, and the middle region being disposed along the headband between the first side region and the second side region.

17. The playback device according to claim 16, wherein the second density is about 83 kg/$m^3$.

18. The playback device according to claim 16, wherein the first density is about 25% lower than the second density.

19. The playback device according to claim 16, wherein the first density and the second density are configured such that when the headband is worn, the headband applies uniform pressure.

20. The playback device according to claim 16, wherein a length of the middle region along the connecting member is between about 25 mm and 35 mm and a length of each adjacent side regions is about 50 mm, and in a direction from the connecting member to a contact surface, a thickness of the middle region substantially matches a thickness of the adjacent side regions.

* * * * *